(No Model.) 4 Sheets—Sheet 1.

J. W. SUTTON.
MACHINE FOR PLUCKING PELTS.

No. 322,137. Patented July 14, 1885.

WITNESSES: A. Schehl, Carl Kay

INVENTOR John W. Sutton

BY Gospels & Raegner
ATTORNEYS.

(No Model.) 4 Sheets—Sheet 2.

J. W. SUTTON.
MACHINE FOR PLUCKING PELTS.

No. 322,137. Patented July 14, 1885.

WITNESSES: A. Schehl, Carl Kain

INVENTOR John W. Sutton
BY Goepel & Raegener
ATTORNEYS.

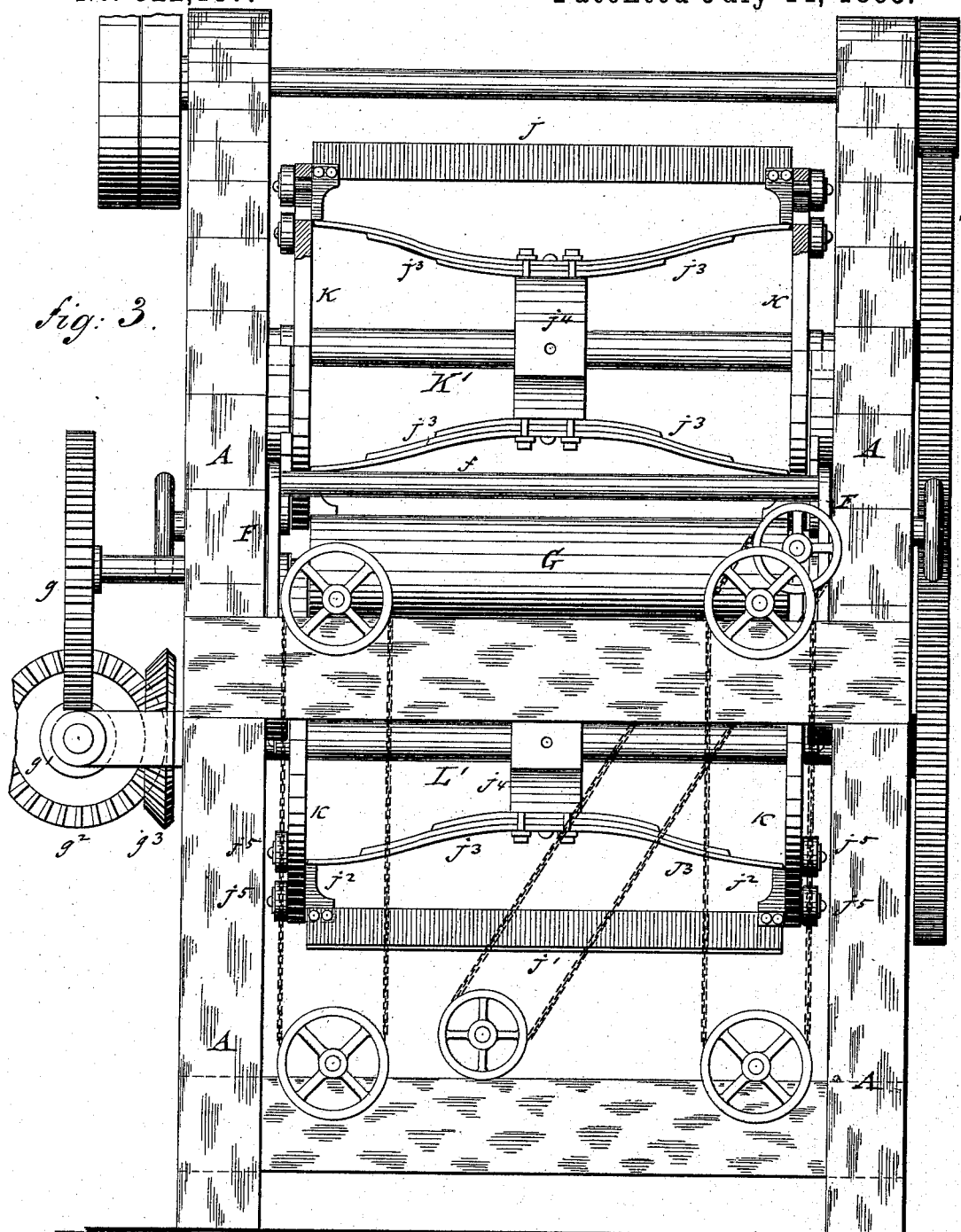

(No Model.) 4 Sheets—Sheet 4.
J. W. SUTTON.
MACHINE FOR PLUCKING PELTS.
No. 322,137. Patented July 14, 1885.
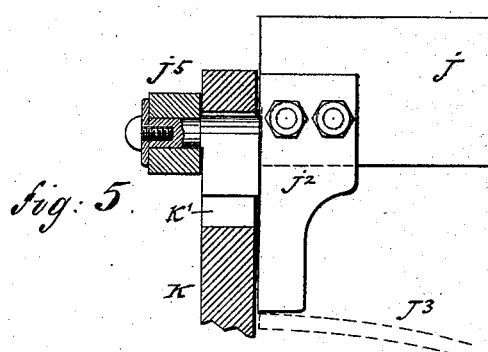
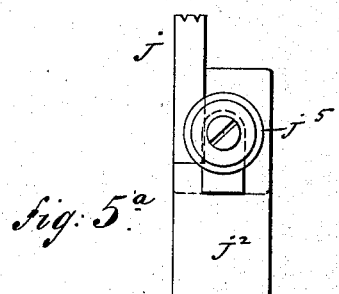
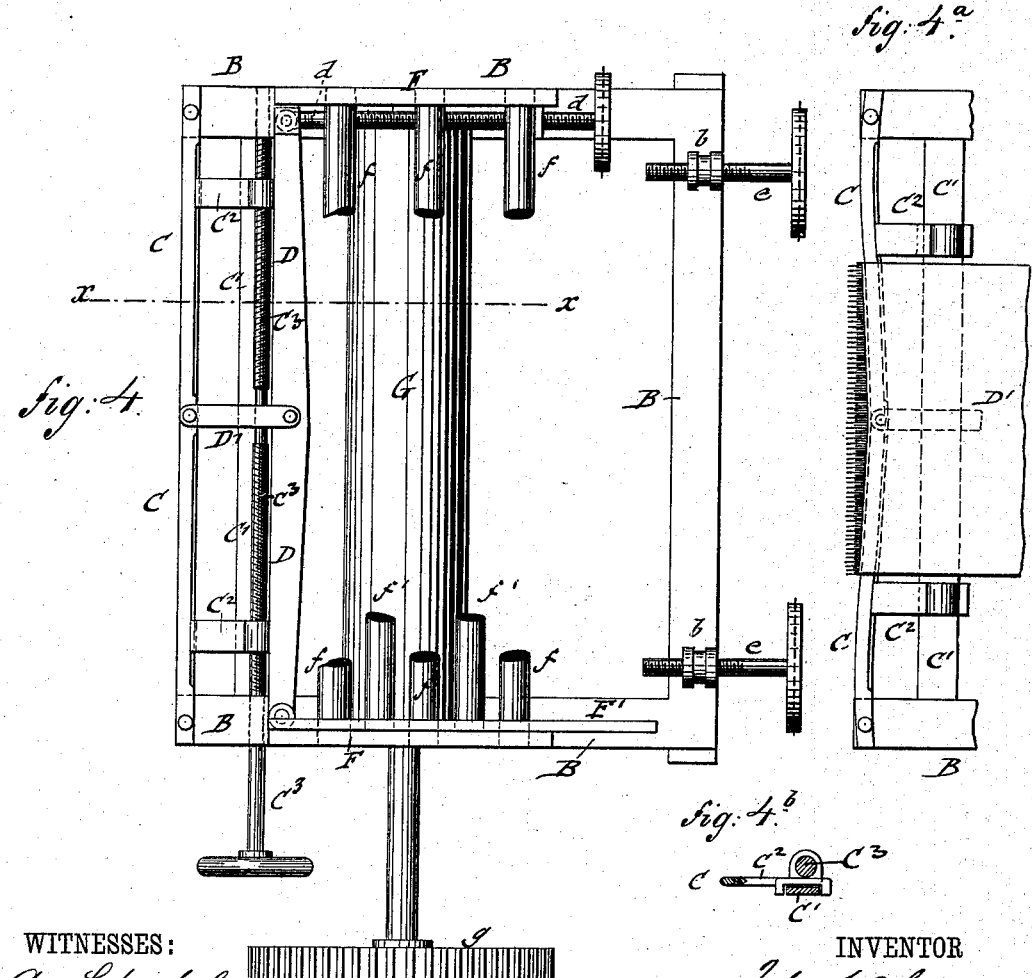
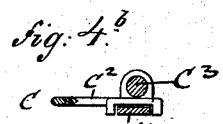
WITNESSES:
A. Schiehl
Carl Karr
INVENTOR
John W. Sutton
BY
Goepel & Raegener
ATTORNEYS.

UNITED STATES PATENT OFFICE.

JOHN W. SUTTON, OF NEW YORK, N. Y.

MACHINE FOR PLUCKING PELTS.

SPECIFICATION forming part of Letters Patent No. 322,137, dated July 14, 1885.

Application filed January 17, 1885. (No model.)

*To all whom it may concern:*

Be it known that I, JOHN W. SUTTON, of the city, county, and State of New York, have invented certain new and useful Improvements in Machines for Plucking Beaver and other Skins, of which the following is a specification.

This invention has reference to an improved machine for removing the master-hairs from pelts by plucking them, without injury to the fur, while in their raw state and before they are dressed and dyed, the machine being worked by power, so as to produce the object of unhairing in a quick, cheap, and effective manner.

The invention consists of a machine for plucking pelts, composed of a stretcher-bar, means for feeding the pelt over the stretcher-bar, and of two rotating jaw-frames which are arranged above and below the stretcher-bar and provided with radially-guided and spring-actuated plucking-jaws. The upper jaw-frame is provided with brushes intermediately between its plucking-jaws. The jaws are guided in slots of the disk-shaped heads of the frames and guided by anti-friction rollers along concentric cams above and below the stretcher-bar, so as to clear the pelt until the jaws arrive in line with the water-hairs, when they are released from the cams, for gripping and plucking the master-hairs. The flexible stretcher-bar is supported on a laterally-adjustable carriage, that also supports the feed-roller, guide-roller, and friction-rods for the pelt. The flexible stretcher-bar is provided with laterally-adjustable stays, by means of which the curvature of the front edge of the bar is accurately adjusted to the width of the pelts and the length of fur of the same.

The invention consists, further, of certain details of construction and combination of parts, as will be described hereinafter, and finally pointed out in the claims.

Figure 1:
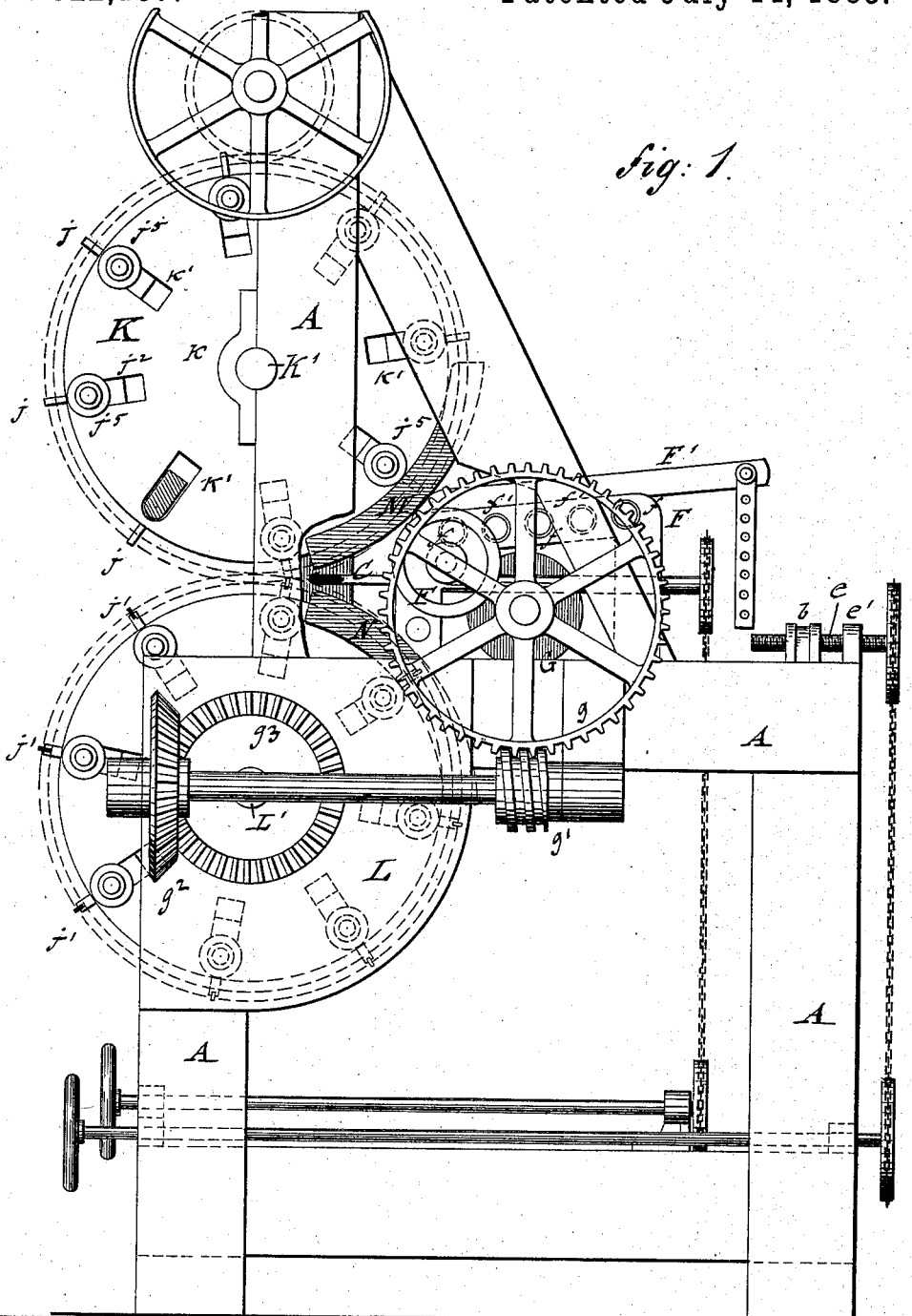
Figure 2:
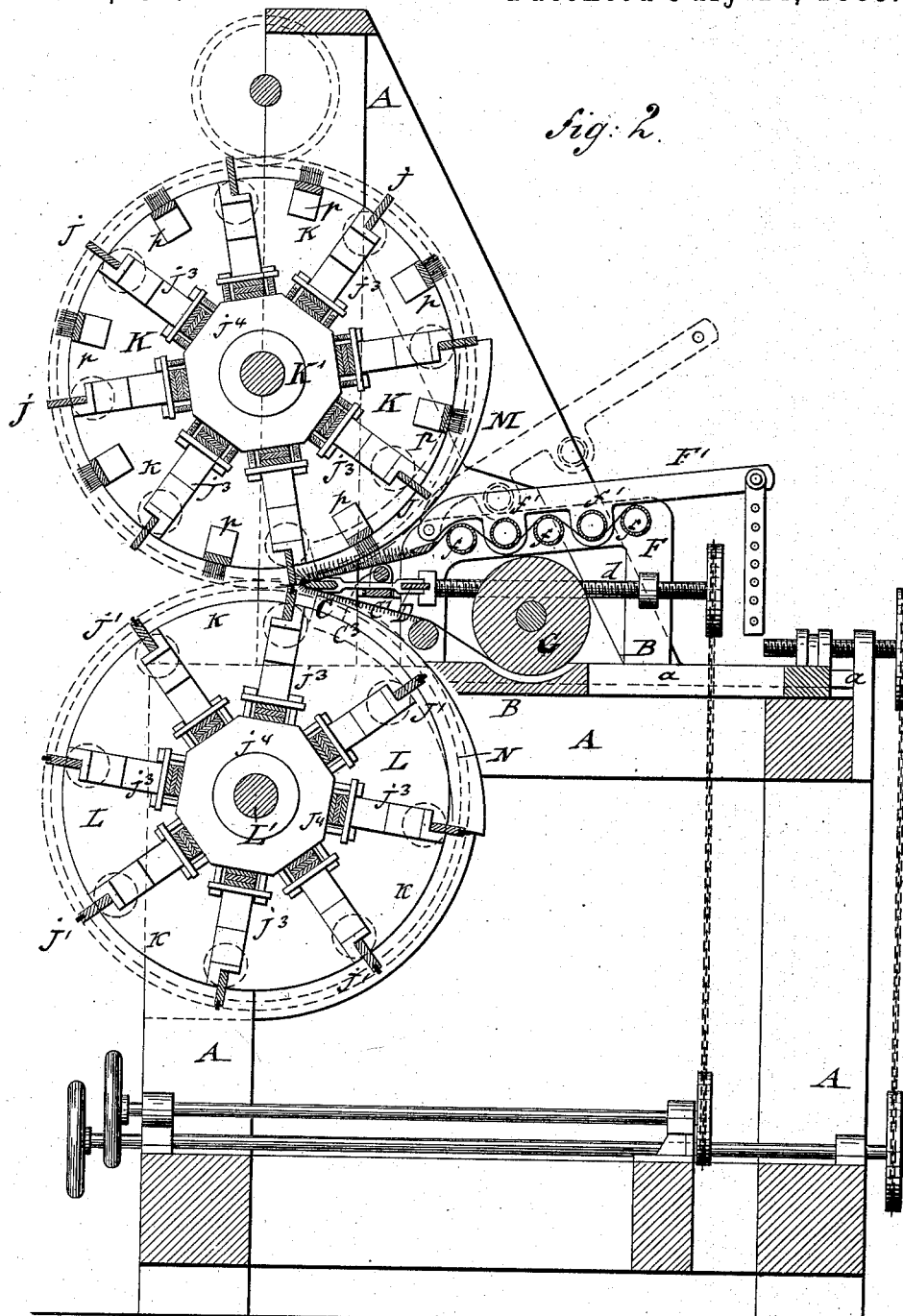

In the accompanying drawings, Figure 1 represents a side elevation, with parts broken off, of my improved machine for plucking pelts. Fig. 2 is a vertical longitudinal section of the same; Fig. 3, a front elevation, and Fig. 4 a plan, of the stretcher-bar; Fig. 4ª, a plan of the stretcher-bar with a pelt stretched over the same; Fig. 4ᵇ, a detail vertical transverse section on line $x\,x$ of Fig. 4, and Figs. 5 and 5ª are details of the plucking-jaws.

Similar letters of reference indicate corresponding parts.

Referring to the drawings, A represents the supporting-frame of my improved machine for plucking pelts.

B is a horizontally-adjustable carriage, that is supported on the frame A and is arranged with the devices for guiding and feeding the pelts. The carriage B is guided in its forward and backward motion on the frame A upon ways $a\,a$.

At the front part of the carriage B is arranged a stretcher-bar, C, which is firmly attached at the ends to the front part of the carriage, and formed of a light flexible steel blade, the front edge of which is rounded off or beveled, according to the kind of pelts to be plucked.

Back of the stretcher-bar C is arranged a lever, D, which is pivoted at one end to the carriage B and attached at the other end to a screw-rod, $d$, by which the lever D is adjusted closer to or farther away from the stretcher-bar C. The lever D is connected to the center of the stretcher-bar C by means of a pivot-link, D', so that when the end of the lever D is moved backward or forward by its adjusting screw-rod $d$ a greater or less curvature is imparted to the edge of the stretcher-bar C.

In front of the lever D is arranged a fixed guide-bar, C', which is stiff enough to resist the pull of the lever D and of the pelt stretched over the bar C, and which serves to guide two stays, C², that are applied by their flanged rear ends to the fixed guide-bar C' and by their grooved front ends to the beveled rear edge of the stretcher-bar C.

The rear ends of the stays C² are provided with screw-nuts, through which passes a right- and-left-hand screw-shaft, C³, that is turned by a hand-wheel at one end, so as to produce the lateral adjustment of the stays C². The stays C² serve for adjusting the width of the curved portion of the stretcher-bar C to the different widths of the pelts to be plucked.

Instead of making the stretcher-bar C of one flexible steel bar, the same result may be obtained by making the same of several sections, which are pivoted together; but I prefer the flexible steel bar, as it bends in a continuous curve without forming angles, as would be the case when the bar is made of jointed sections.

The carriage B is adjusted on the supporting-frame A by two screws, $e\ e$, which engage threaded lugs $b\ b$ of the carriage B and pass through threaded lugs $e'$ at the back of the frame A.

The adjustment of the stretcher-bar, as well as the adjustment of the carriage B in forward or backward direction, is accomplished from the front part of the machine by means of longitudinal shafts turning in bearings at the lower part of the frame A, said shafts being connected by transmitting-chains with sprocket-wheels at the rear ends of the adjusting-screw $d$ of the lever D and of the adjusting-screws $e\ e$ of the carriage, as shown clearly in Figs. 1 and 3, whereby the adjustment of the stretcher-bar C and carriage B is readily accomplished by the operator from the place where he is sitting.

At both sides of the carriage B are arranged yoke-shaped standards F F, which support fixed transverse friction-rods $f\ f$, on which the pelt to be picked is placed.

Intermediate friction-rods, $f'\ f'$, are attached to a pivoted lever-frame, F', which may be raised or lowered, and the rods $f'\ f'$, which exert, together with the rods $f\ f$, the proper friction on the pelt.

A feed-roller, G, is supported in bearings of the carriage B, and slowly rotated by means of a worm-gear, $g\ g'$, Fig. 1. The worm-gear is actuated by transmitting bevel-gears $g^2\ g^3$ from the shaft of the lower rotating jaw-frame.

The pelt to be plucked is attached by means of a strip of cloth to the feed-roller G, after it has been first passed over the friction-rods and the stretcher-bar, as shown in Fig. 2.

In front of and above and below the stretcher-bar are arranged two rotating jaw-frames, K and L, the upper one of which supports a series of spring-actuated plucking-jaws, $j$, while the lower one supports a corresponding series of plucking-jaws, $j'$, that work in connection with the jaws of the upper frame, K. The jaws $j\ j'$ are supported by two end disks or heads, $k$ and $k$, which are keyed to transverse shafts K' L', supported in bearings of the frame A. Each disk or head $k$ is provided with a number of radial slots, $k'$, that act as guides or ways for the sliding heads $j^2\ j^2$ of the plucking-jaws. These heads $j^2\ j^2$ are acted upon by a strong leaf or other springs, $j^3\ j^3$, that are attached to central hubs, $j^4\ j^4$, on the shafts K' L'. The radial slots or ways extend to about half an inch from the edge of the disks, whereby the motion of the sliding heads is limited and the springs $j^4\ j^4$ prevented from forcing the plucking-jaws too far in outward direction.

The plucking-jaws of the frames K and L are so arranged that they meet in front of the stretcher-bar for taking hold of the master-hairs projecting from the pelt. The jaw-frames K and L receive rotary motion by intermeshing gear-wheels of equal size keyed to their shafts, the upper gear-wheel meshing with a pinion on the driving-shaft at the upper part of the main frame A, to which motion is imparted by a belt-and-pulley transmission.

The plucking-jaws of both frames K and L are rigidly attached to the sliding heads $j^2\ j^2$, and extend transversely from head to head. The sliding heads of the jaws are provided with fixed pivots that extend through the radial slots of the end disks of the frames, and which carry small anti-friction rollers $j^5$, that move along fixed cam-segments M M and N N, that are attached to the upright standards of the supporting-frame A, respectively above and below the stretcher-bar, and in such a manner that their lower ends are nearer to the center of the jaw-frames than the upper ends. By the rotation of the frames K and L the anti-friction rollers $j^5\ j^5$ are moved along the cam-segments M M and N N, whereby the transverse plucking-jaws are forced inwardly toward the center of their frames against the pressure of their springs until they arrive at the adjacent ends of the cam-segments, at which points the rollers $j^5\ j^5$ are released and the jaws $j\ j'$ forced forward, so as to meet and take hold of the master-hairs projecting from the pelt. The plucking-jaws $j$ of the upper frame, K, are made in the shape of a blade, having one or more slight grooves in their face, while the plucking-jaws of the lower frame, L, are made of a greater width and provided with a deep groove along their edge, into which a strip of india-rubber is inserted, which forms an elastic seat for the plucking-blade of the upper frame, K. The upper frame, K, is provided intermediately between the plucking-blades with fixed transverse brushes $p\ p$, of wire, which serve to brush the fur and hairs in forward direction, whereby the master-hairs are straightened and set parallel, or nearly so, with each other, so that they present themselves in straight direction instead of crosswise to the plucking action of the jaws. The plucking-jaws meet in front of the stretcher-bar, slightly back of a vertical plane passed through the axis of the shafts of the jaw-frames, the jaws remaining together until they are separated from each other by the rotation of the frames.

The springs that force the jaws together must be strong enough to exert a tight grip upon the master-hairs, so as to pull them out of the skin.

In some cases the plucking-jaws are not required to pull the hairs out in a straight line, but in slightly downward and forward direction. To provide for this action of the plucking-jaws, the springs of the upper jaw-frame are made stronger than those of the lower frame, so that when the jaws meet, the spring of the upper jaw will force the spring of the lower jaw downward until the pressure of the springs is equalized, in which case the pull upon the hairs will be in a downward slanting direction.

As the plucking-jaws of the rotating frames meet at a fixed point the stretcher-bar and its carriage has to be made adjustable, so as to provide for the uniform plucking of the hairs without injuring the fur. The curve imparted to the edge of the flexible stretcher-bar serves to bring the fur at the middle part— that is to say, at the back and sides of the pelt—in a line parallel to the plucking-jaws, owing to the fact that the fur at the center or back is longer than at the sides; but as the length of the fur is different in different skins, and of varying length in different parts of the same skin, the curve formed by the edge of the flexible stretcher-bar must be capable of quick adjustment, as required by the skin. To prevent the pulling out of any part of the fur by the plucking-jaws, the stretcher-bar has to be adjusted to such a distance from the same as required by the length of the fur. For this purpose the carriage, with its skin, is moved backward or forward by means of its adjusting-screws, so that the entire edge of the fur is adjusted relatively to the plucking-jaws, while the laterally-adjustable stays of the stretcher-bar serve to adapt the curvature of the same for any width of skins, which are thereby fully within the control of the operator.

Operation: In preparing the pelts for plucking, a piece of strong cloth is sewed to each end of the pelt, the cloth at the front end being passed alternately above and below the friction-rods and around the stretcher-bar, and is attached to the feed-roller, while the cloth at the tail end of the pelt is to keep the pelt taut as the same is passing through and beyond the friction-rods. As the skin is passed through with the head end foremost, the master-hairs naturally incline backward. By the action of the brushes of the upper jaw-frame the fur and hair are brushed forward. The feed mechanism moves the skin forward for about one-eighth of an inch for each rotation of the jaw-frames, which furnishes about one sixty-fourth of an inch for the action of each pair of plucking-jaws. When the skin arrives at the edge of the stretcher-bar, the stiff water-hairs stand out at right angles to the same in forward direction, in which position they are taken hold of by the plucking-jaws, which close on the hairs at the moment when they are released from the cam-segments along which they have been guided by their anti-friction rollers. The stretcher-bar has to be so adjusted by the operator that the fur will just clear the edges of the plucking-jaws, and that the ends of the fur are parallel with the same. At the moment when the plucking-jaws are released from their cams the thin edge of the upper blade or jaw presses into the elastic wider surface of the lower jaw, which thereby grips the projecting master-hairs firmly, so as to pluck them from the skin as the jaws are moved forward away from the stretcher-bar. When the jaws are separated by the rotation of the jaw-frames, the hairs are dropped by the jaws. The brush following the jaws straightens and sets the hairs ready for the action of the next following jaws, while the feed mechanism places a narrow strip adjoining the one just plucked over the edge of the stretcher-bar. The projecting hairs of this strip are then gripped by the next pair of jaws, which pulls the hairs out, and so on, until the entire skin is finished.

The operator must carefully observe any changes of the skin in its width, so as to change the curve of the stretcher-bar and the position of the carriage accordingly.

The advantage of my improved machine for plucking pelts are, first, the adjustment of the surface of the fur by means of a curved flexible stretcher-bar, together with the quick adjustment of the distance of the stretcher-bar from the plucking-jaws; second, the straightening out of the fur and hairs by the brushes and the straight pull exerted by the plucking-jaws on the master-hairs; third, the speed by which the machine can be worked, so that a large number of skins can be plucked within a given time; and, fourth, the convenient disposition of the working parts of the machine, so that the operator, who sits in front of the rotating jaw-frame, is enabled to watch the skin at all times and to adjust the working parts without leaving his place.

Having thus described my invention, I claim as new and desire to secure by Letters Patent—

1. The combination of a flexible stretcher-bar, means for feeding the pelt over the stretcher-bar, and rotating jaw-frames having radially-guided and spring-actuated plucking-jaws, substantially as set forth.

2. The combination of a flexible stretcher-bar, means for guiding and feeding the pelt over the same, and rotating jaw-frames having radially-guided and spring-actuated plucking-jaws, the upper jaw-frame being provided with brushes between the jaws, substantially as set forth.

3. The combination of a flexible stretcher-bar, means for feeding the pelt over the same, and rotating jaw-frames having radially-guided and spring-actuated plucking-jaws, said jaws being adapted to close in front of the stretcher-bar, so as to grip and pluck the master-hairs, substantially as set forth.

4. The combination of a flexible stretcher-bar, means for adjusting the curvature of the stretcher-bar, an adjustable carriage supporting the stretcher-bar, means to feed the pelt over the stretcher-bar, and rotating jaw-frames having radially-guided and spring-actuated plucking-jaws, substantially as set forth.

5. The combination of a flexible stretcher-bar, means to guide and feed the pelt over the same, rotating jaw-frames located respectively above and below the stretcher-bar, and provided with radially-guided and spring-actuated plucking jaws or blades, the upper jaw-frame being provided with intermediate brushes, substantially as set forth.

6. The combination of a flexible stretcher-bar, means to actuate and feed the pelt over the edge of the same, rotating jaw-frames located respectively above and below the stretcher-bar and provided with radially-guided and spring-actuated plucking-jaws, and fixed cam-segments located eccentrically to the rotating jaw-frames above and below the stretcher-bar, whereby the plucking-jaws are moved back when approaching the stretcher-bar and released when arriving in front of the same, substantially as set forth.

7. The combination of a flexible stretcher-bar, means to guide and feed the pelt over the edge of the same, rotating jaw-frames located above and below the stretcher-bar and provided with radially-guided and spring-actuated plucking-jaws, the jaws of the upper frame being formed of a thin blade, while the jaws of the lower frame are formed of a wider blade with a facing of rubber, substantially as set forth.

8. The combination of a flexible stretcher-bar, means to adjust the curvature of the stretcher-bar, a carriage supporting the stretcher-bar, means for adjusting the carriage and stretcher-bar, and rotating jaw-frames having radially-guided and spring-actuated plucking-jaws, substantially as set forth.

9. In a machine for plucking pelts, the combination of a pelt-supporting carriage, a flexible stretcher-bar supported on the front end of the same, laterally-adjustable stays, a transverse lever, a pivot-link connecting the stretcher-bar with said lever, and means to adjust the transverse lever and vary the curvature of the stretcher-bar, substantially as set forth.

10. In a machine for plucking pelts, the combination of the supporting-carriage, a flexible stretcher-bar supported on the same, a transverse lever pivoted at one end and connected adjustably at the other end to a screw, a pivot-link connecting the stretcher-bar and transverse lever, a fixed transverse guide-bar, stays bearing on the back of the stretcher-bar, and means for laterally adjusting said stays, substantially as set forth.

11. In a machine for plucking pelts, the combination of the supporting-carriage having transverse friction-bars, a flexible stretcher-bar at one end of the same, means for adjusting the curvature of the stretcher-bar, and means for feeding the pelt over the stretcher-bar, substantially as set forth.

12. In a machine for plucking pelts, a rotating jaw-frame, consisting of end disks having radial guide-slots, transverse plucking-jaws, supporting-heads sliding in said guide-slots, and springs acting on said guide-heads, substantially as set forth.

In testimony that I claim the foregoing as my invention I have signed my name in presence of two subscribing witnesses.

JOHN W. SUTTON.

Witnesses:
PAUL GOEPEL,
SIDNEY MANN.